(12) United States Patent
Engdahl

(10) Patent No.: US 10,074,071 B1
(45) Date of Patent: Sep. 11, 2018

(54) DETECTION OF INNER PACK RECEIVE ERRORS

(71) Applicant: Amazon Technologies, Inc., Seattle, WA (US)

(72) Inventor: Patrick Christopher Engdahl, Renton, WA (US)

(73) Assignee: Amazon Technologies, Inc., Seattle, WA (US)

( * ) Notice: Subject to any disclaimer, the term of this patent is extended or adjusted under 35 U.S.C. 154(b) by 444 days.

(21) Appl. No.: 14/732,176

(22) Filed: Jun. 5, 2015

(51) Int. Cl.
*G06Q 30/00* (2012.01)
*G06Q 10/08* (2012.01)

(52) U.S. Cl.
CPC ......... *G06Q 10/087* (2013.01); *G06Q 10/083* (2013.01)

(58) Field of Classification Search
CPC ...... G06K 19/00; G06Q 30/00; G06Q 10/087; G06Q 10/08
USPC .................. 235/379; 705/28, 407; 340/13.31
See application file for complete search history.

(56) References Cited

U.S. PATENT DOCUMENTS

| | | | | |
|---|---|---|---|---|
| 4,661,955 A * | 4/1987 | Arlington | ........... | G06F 11/1028 714/52 |
| 5,656,799 A * | 8/1997 | Ramsden | ............. | G01G 19/005 177/2 |
| 5,953,375 A * | 9/1999 | Nishiwaki | ........ | G11B 20/10527 375/259 |
| 6,917,924 B1 * | 7/2005 | Ramsden | ............. | G01G 19/005 705/401 |
| 8,219,558 B1 * | 7/2012 | Trandal | ................ | G06Q 10/087 707/736 |
| 8,556,167 B1 * | 10/2013 | Nichols | .................. | G06Q 10/08 235/375 |
| 2005/0046584 A1 * | 3/2005 | Breed | ...................... | B60C 11/24 340/13.31 |
| 2006/0089936 A1 * | 4/2006 | Chalker | ............ | G06F 17/30094 |
| 2006/0220842 A1 * | 10/2006 | Breed | .................... | G06Q 10/06 340/539.13 |
| 2008/0088441 A1 * | 4/2008 | Breed | ..................... | B60C 11/24 340/539.26 |
| 2008/0174423 A1 * | 7/2008 | Breed | ................... | B60N 2/002 340/539.22 |
| 2009/0015400 A1 * | 1/2009 | Breed | ..................... | B60C 11/24 340/539.22 |
| 2009/0285483 A1 * | 11/2009 | Guven | ................. | G06Q 30/016 382/181 |
| 2010/0131310 A1 * | 5/2010 | Wall | .................... | G06Q 10/0631 705/7.12 |
| 2010/0141435 A1 * | 6/2010 | Breed | .................... | G06Q 10/06 340/539.13 |
| 2011/0246330 A1 * | 10/2011 | Tikku | ................. | G06F 17/30247 705/27.1 |
| 2012/0037700 A1 * | 2/2012 | Walji | .................... | G06Q 10/087 235/385 |

(Continued)

*Primary Examiner* — Oluseye Iwarere
(74) *Attorney, Agent, or Firm* — Kilpatrick Townsend & Stockton LLP

(57) ABSTRACT

Embodiments herein described relate to methods for enabling the detection of inner pack receive errors at a receiving site for a marketplace by comparing quantities of predicted and received items by receiving a predicted quantity, determining a received quantity, performing a modulus division of the predicted and received quantities of items, and using the remainder to detect the presence of inner packs within received packages of items.

25 Claims, 9 Drawing Sheets

(56) References Cited

U.S. PATENT DOCUMENTS

| | | | |
|---|---|---|---|
| 2012/0183185 A1* | 7/2012 | Grigsby | G06F 17/30256 382/128 |
| 2012/0246027 A1* | 9/2012 | Martin | G06Q 30/00 705/26.63 |
| 2013/0117269 A1* | 5/2013 | Sacco | G06F 17/30247 707/740 |
| 2014/0003727 A1* | 1/2014 | Lortz | G06Q 10/087 382/218 |
| 2014/0156459 A1* | 6/2014 | Zises | G06Q 30/0623 705/26.61 |
| 2014/0214628 A1* | 7/2014 | Argue | G06Q 30/0643 705/27.1 |
| 2014/0244392 A1* | 8/2014 | Chang | G06Q 10/087 705/14.58 |
| 2014/0363059 A1* | 12/2014 | Hurewitz | G06Q 30/0201 382/118 |
| 2015/0019391 A1* | 1/2015 | Kumar | G06Q 10/087 705/28 |
| 2015/0026156 A1* | 1/2015 | Meek | G06F 17/30705 707/722 |
| 2015/0066712 A1* | 3/2015 | Altieri | G06Q 10/087 705/28 |
| 2015/0120505 A1* | 4/2015 | Deshpande | G06Q 30/0623 705/26.61 |

* cited by examiner

DETECTION OF INNER PACK RECEIVE ERRORS

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance.

In a modern inventory system, errors in accurate recording of received packages and stowed items may require intervention and verification to correct. Such errors may occur when packaging from a vendor fails to conform to expected parameters or when processing of received packaging errs. Proactive detection and categorization of errors in the recording of received items may significantly improve operation of an entire inventory system by reducing the time requirements for intervention and error correction.

BRIEF DESCRIPTION OF THE DRAWINGS

Various embodiments in accordance with the present disclosure will be described with reference to the drawings, in which.

DETAILED DESCRIPTION

Figure 1:
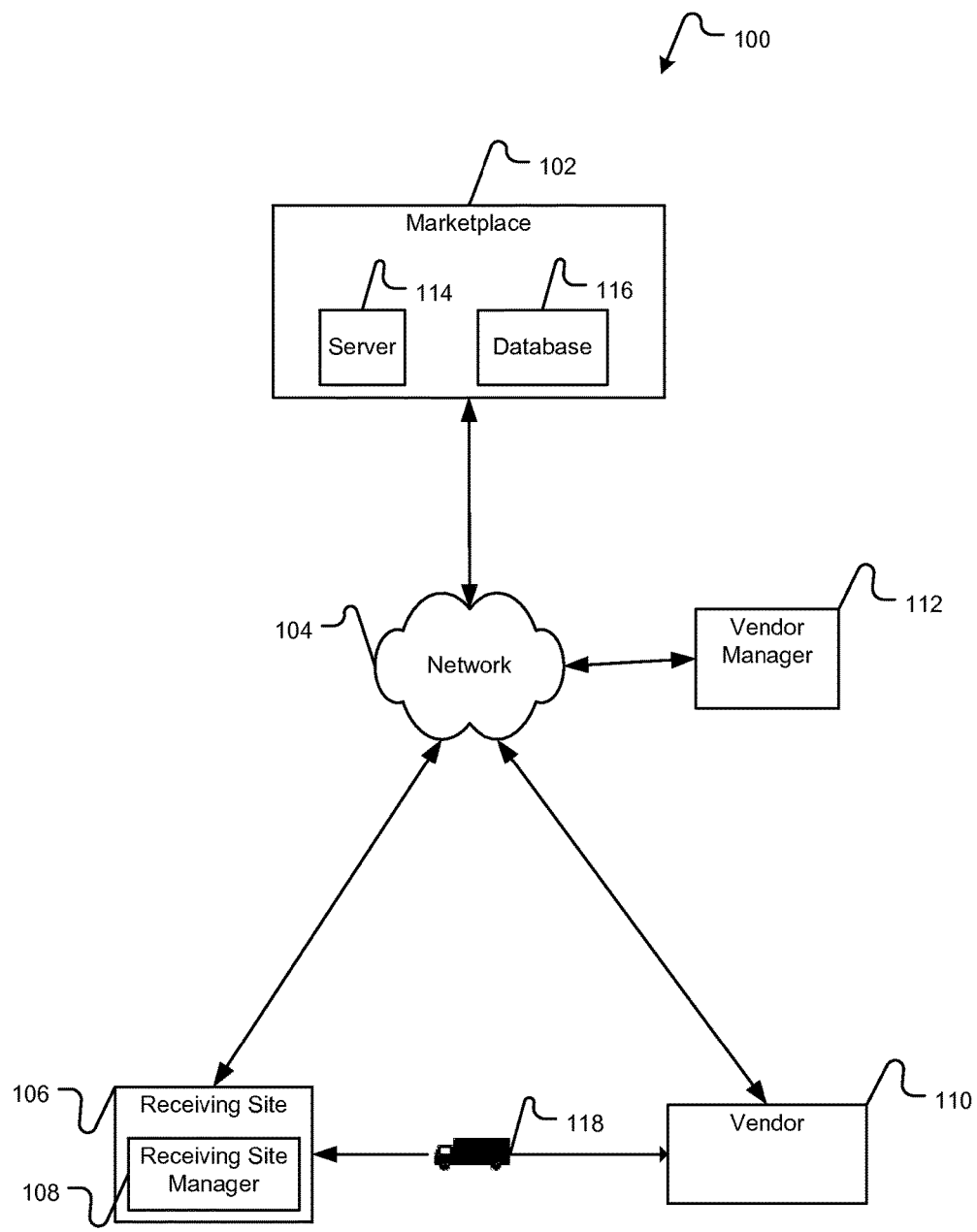
FIG. 1 is a block diagram of an example system for enabling the detection of inner pack receive errors, in accordance with embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

A receiving site for an electronic marketplace may receive an abundance of varieties of products from many vendors. These products may be intended for sale as units containing single items, as salable units containing multiple items, or as packages of disparate items. The intended unit for sale (which may be an individual unit or a group of units) is generally, though not always, the same as the intended unit for stowage, or the "stowable unit." Whether items are intended to be stowed individually or as packages, a function of a receiving site is to record and store the correct stowable units. "Stowable units" may refer to individual items absent any package, to individual items including a wrapping or package, to collections of items absent any package (that may be wrapped in a package or inner package for shipping), or to collections of items including a wrapping or packaging.

Packages received from vendors, which may also be referred to as cartons or masterpacks, may include a variety of different package nesting arrangements. For example, cartons may contain a collection of individual items directly, or the items may be individually packaged within the carton, or items may be packed within a collection of sub-packages or inner packs each containing multiples of items. Any or all of the above packages (including cartons, inner packs, individual items packages, or the items themselves) may have an identifier thereon. Additionally, any of the above may be associated with stored information or accompanying information designating or describing the contents thereof. The associated information or accompanying information may not always be fully accurate in describing the packaging or the included items. Although it would be advantageous to have vendors conform universally to a standard package nesting system in order to alleviate confusion; some vendors may resist altering their package nesting arrangements.

Techniques described herein include methods and systems of detecting errors in package handling corresponding to package nesting arrangements that include inner packs, as described above, sometimes called "inner pack errors." Although advantageous as applied to an electronic marketplace where a substantial number of different items are regularly received, the embodiments of systems and methods of inner pack receive error detection herein disclosed may also be advantageous at any conventional marketplace, warehouse, storage site, or physical storefront where items are tracked electronically. Embodiments can offer advantages for electronically tracked inventory systems wherever items are received and stowed on a routine basis. For purposes of clarity, we will refer to an "electronic marketplace" and an associated "receiving site" herein; but a receiving site may be any receiving site associated with any suitable marketplace, warehouse, storage site, or physical store.

A receiving protocol at a receiving site may not be equipped to fully accommodate all possible permutations of packing arrangements within a received package, particularly when the packing arrangement deviates from an expected packaging system. By way of example, in a conventional receiving site, a carton containing items may be received and the carton may have an associated invoice or manifest. The manifest may identify that the carton contains eight items; however, the carton may contain a package nesting arrangement including four inner packs, each containing two items, for a total of eight items. In this example of a packing arrangement, the manifest would correctly predict receipt of eight items, but a conventional receiving protocol may count the four inner packs instead of the eight items, thus incorrectly determining that the carton contained only four items; thus a record taken when the carton is unpacked may register that only four items have been received. As a consequence of this incorrect count, a total account of the items received at the receiving site will be incorrect. This error is referred to as an "inner pack receive error."

A second type of inner pack receive error, which may be termed a "broken set receive error," can occur when the salable unit (or stowable unit) is a pack of multiple items. For example, small household or toiletry items are often packaged together for sale as a unit of two, three, or more items. For example, the items may be shrink-wrapped together with individual identifiers (such as UPC's) visible, which can cause an automated scanner or a receiving agent to incorrectly scan the individual identifiers and break a pack which is intended to remain intact. Alternatively, it may be unclear from packaging whether the inner pack is intended to be broken or to remain intact; for example, inner packs may include markings describing a number of items therein without indicating that said items are a set. A broken set receive error occurs when an inner pack of multiple items, which is intended to be stowed and/or sold as a set, is broken into multiple individual items at a package receiving or stowing step in an inventory management system.

An inner pack receive error may propagate to stowing incorrectly identified inner packs or individual items at storage locations in the receiving site. The error may remain unnoticed until, for example, a period of time has elapsed since the expected receipt of the items and the expected count of received items fails to match a number of items ordered. However, through the use of embodiments described herein, methods and systems using a comparison of the predicted, received, and/or stowed items, may enable inner pack receive errors to be detected, mitigated and corrected more efficiently.

For example, suppose Adam processes inbound packages at a warehouse receiving site and sends them to Ben, Ben unloads the boxes and sends their contents to Carly, and Carly stows the contents in the warehouse. Each of Adam, Ben and Carly record the respective items that they handle according to identification codes printed on the items, and the information is recorded in a database. When Adam records an inbound carton, the central database is updated with the information that a package containing eight widgets has arrived at the warehouse. Ben unpacks the carton, and discovers four smaller boxes, or inner packs, inside the carton; but Ben is unaware that each inner pack contains two widgets. He records that four widgets have been received. Carly stows the four inner packs, and she records that four widgets have been stowed. Thus, the database now contains misleading information indicating that only four widgets have been received and stowed.

To overcome the above-described conundrum, Adam, Ben and Carly can be assisted by a receiving site manager, including a predictive troubleshooting module for identifying inner pack receive errors. The receiving site manager can determine a predicted quantity of widgets that are supposed to be contained in the carton based on data received related to the carton, which may be associated with the particular carton by the identifier recorded by Adam or by an automated process, and may also include physical characteristics of the carton such as the size and/or weight of the carton. The receiving site manager can determine the predicted quantity from any suitable combination of retrieved data including earlier records of shipments by the particular shipper, an invoice or manifest provided by the shipper, or a table of carton sizes and/or contents associated with the shipper. The receiving site manager can also obtain numbers of received and stowed items from the records entered by Ben and Carly, respectively. Using these data, the receiving site manager can invoke a predictive troubleshooting module that performs a modulus division of the predicted quantity (P) divided by the stowed quantity (S). If the values of P and S are equal, the predictive troubleshooting module need not perform any further processing. If the values of P and S are unequal and there is a remainder upon performing the modulus division, then the predictive troubleshooting module can flag the items and/or return a report advising that an associate or an automated process investigate. However, if there is no remainder upon performing the modulus division, and P is greater than S, the predictive troubleshooting module can indicate that the items should be checked for an error in unpacking specifically related to the presence of inner packs. The predictive troubleshooting module can provide this indication to a verification system that retrieves and corrects stowed items; or in some cases it can provide this alert to Carly between the time she records and stows each package, including an instruction to break the inner packs into the individual items. By streamlining the process of identifying errors associated with receiving inner packs, a significant amount of time and confusion may be prevented in the management of inventory in the warehouse.

In another example, suppose that the stowable unit is a two-pack of widgets rather than an individual widget. When Adam records an inbound carton, the central database is updated with information that a package contains four two-packs of widgets instead of eight individual widgets. In this case, each of the pairs of widgets is a stowable item. However, Ben unpacks the carton, finds the four inner packs, and mistakenly breaks them. He records that eight stowable units of widgets have been received; and Carly subsequently stows eight widgets and records that the eight stowable units of widgets have been stowed. Thus, the database now contains misleading information that eight stowable units of widgets have been stowed when in fact only four two-packs of widgets have been received.

To overcome this conundrum, Adam, Ben and Carly can be assisted by a receiving site manager in a similar manner to that described above. The receiving site manager can obtain numbers of received and stowed items from the records entered by Ben and Carly, respectively. Using these data, the receiving site manager can invoke the predictive troubleshooting module that first compares the predicted quantity (P) and the stowed quantity (S). If the value of S is greater than the value of P, and there is no remainder upon performing a modulus division of S over P, then the predictive troubleshooting module can indicate that the items should be checked for a broken set receive error, which is a subset of inner pack receive errors.

In accordance with at least one embodiment, a receiving site associated with a marketplace may provide for streamlined detection of inner pack receive errors, and resolution of errors associated with the processing of inner packs at the receiving site. The receiving site and marketplace, which may be an electronic marketplace, may communicate data related to items shipped by a vendor to the receiving site via a network. A receiving site manager, which may be co-located at the receiving site, or may be located offsite but connected to the receiving site by a network, can function to assist with the management of received packages. The receiving site manager can include one or more modules and other components of one or more computer systems, where the modules can include: a prediction module, a receiving module, a stowing module, a verification module, a predictive troubleshooting module, and/or a receiving database (which may be a plurality of databases) for storing information. Any or all of the above modules may be operated from the same or from different suitable computing systems, which can be co-located at the receiving site but may also be located offsite and communicate with computer systems on-site via a network.

Referring now to the figures, FIG. 1 is a block diagram depicting aspects of a system 100 for enabling the detection of inner pack receive errors, in accordance with embodiments. In the example system 100, an electronic marketplace 102, a receiving site 106, a vendor manager 112, and a vendor 110 can communicate with one another via a network 104. The electronic marketplace 102 is an online service having at least a server 114 for enabling online shopping and a database 116 containing at least data concerning products available in the electronic marketplace. The vendor 110 provides items for sale at the electronic marketplace 102 by, responsive to orders placed by the electronic marketplace, physically shipping 118 items to the receiving site 106. The receiving site 106 may also cause the return of items to the vendor 110. At the receiving site 106, one or more computer systems make up a receiving site manager 108 for managing inventory at the receiving site. The receiving site manager 108 may include various modules for carrying out management tasks, which may be co-located physically at the receiving site 106, or which may be located elsewhere and connected to the receiving site 106 via the network 104 or by other suitable means. The vendor manager 112 can facilitate communication between the electronic marketplace 102, the vendor 110, and the receiving site 106. One exemplary function of the vendor manager 112 can be to detect when the vendor has indicated shipment of one quantity of items and the receiving site 106 has recorded receipt of a different quantity of items.

Figure 2:
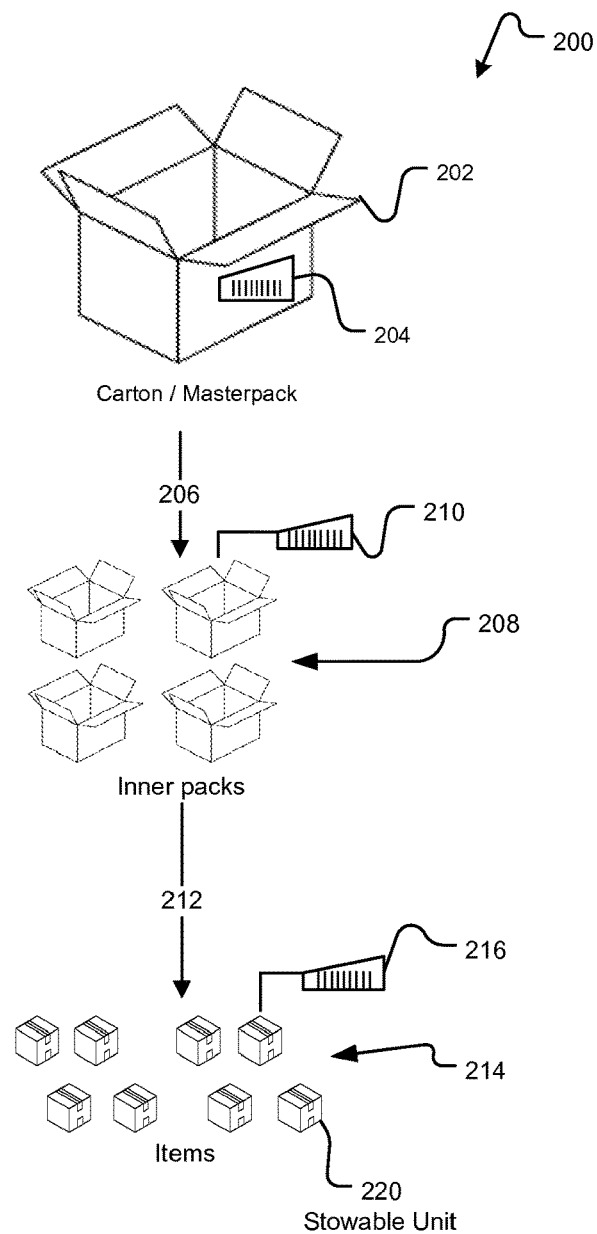
FIG. 2 is a block diagram of an example system for nesting items in packages, in accordance with embodiments.

FIG. 2 is a block diagram of an example system 200 for nesting items in packages, in accordance with embodiments. The example system 200 contains packaging ambiguities that make the system prone to generate inner pack errors. The system 200 includes a carton or masterpack 202 as an exterior package. The carton 202 contains multiple inner packs 208, and each inner pack contains multiple items 214, where each item is a stowable unit 220. In the illustrated system 200, each of the carton 202, each inner pack 208, and each of the items 214 have an identifier; respectively, the carton identifier 204, inner pack identifiers 210, and item identifiers 216. This system 200 is provided for illustrative purposes only, to enable the following description of methods and systems for resolving apparent ambiguity related to the presence of the inner packs 208.

By way of example, in a correct unpacking operation that does not generate an inner pack error, the carton 202 is opened and unpacked 206 to reveal four inner packs 208. Subsequently, and before items are recorded as received, the four inner packs 208 are each opened and unpacked 212 revealing a total of eight items 214. The eight items 214 are each identifiable as individual stowable units 220, and are recorded; and the inner pack identifiers 210 are ignored.

However, the packing arrangement of the illustrated system 200 presents an ambiguous workflow to an unpacking agent or system, whether manually or automatically unpacked. By way of example, in a suboptimal unpacking operation that would generate an inner pack error: the carton 202 is opened and unpacked 206 to reveal four inner packs 208. The inner packs 208 each possess an inner pack identifier 210, which can cause the inner packs to be processed as if they were stowable items. In the suboptimal unpacking operation, the four inner packs 208 can be falsely identified as stowable units and recorded. Other packaging systems may be ambiguous as well; for example: an ambiguous packing system may include additional layers of packaging. Alternatively, an ambiguous packing system may include multiple stowable items each having an identifier being co-packaged together (e.g. in clear bag, shrink-wrap, or any suitable or comparable packaging inside the carton) such that one or more of the identifiers are visible during unpacking, creating ambiguity as to whether the stowable unit is one item or the collection of co-packaged items. For purposes of discussion herein, similarly ambiguous packaging systems will be referred to as "inner packs."

An alternative form of ambiguity in packaging can cause a broken set receive error, whereby an inner pack that is also a stowable unit is mistakenly processed as an inner pack containing multiple stowable units. By way of example, in a suboptimal unpacking operation that would generate a broken set receive error: the carton 202 is opened and unpacked 206 to reveal four inner packs 208. The inner packs 208 are intended to be stowed and may be intended for sale as units, e.g., as "multi-packs." The inner packs 208 may possess an obscured identifier, or may include clear packaging such that identifiers of the items therein are visible, which can cause the inner packs to be processed as if they were a portion of the shipping materials, such that the inner packs may be opened and the individual items therein processed as if they were the stowable units. For purposes of discussion herein, packaging intended to group items as stowable units of multiple individual items will also be referred to as "inner packs."

By contrast, in an unambiguous system for nesting packages, individual stowable units such as stowable unit 220 may be packaged within the carton 202 without any intervening inner packs. In an alternative unambiguous system having inner packs 208, the inner packs do not possess individual inner pack identifiers 210, or possess explicit indicia that each inner pack contains multiple stowable units. In another alternative unambiguous system having inner packs 208, the inner packs possess individual inner pack identifiers 210 and/or additional markings which correctly identify the inner pack as a stowable item which is distinct from the items therein, e.g., a "multi-pack" designated for stowage and sale as a package.

Figure 3:
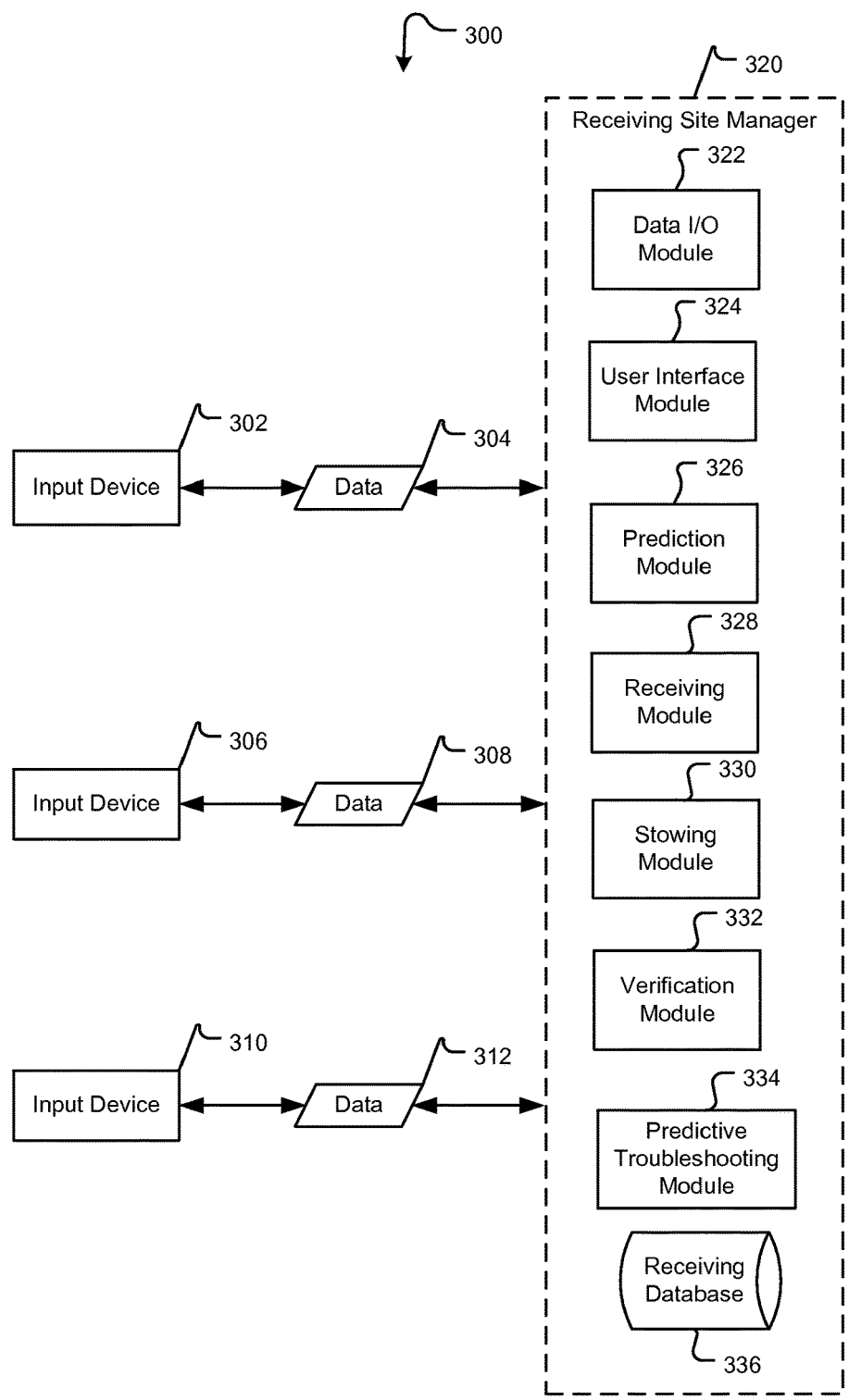
FIG. 3 is a block diagram of an example system for detecting inner pack receive errors in accordance with the systems shown in FIGS. 1 and 2.

FIG. 3 is a block diagram illustrating aspects of a system 300 for enabling the detection of inner pack receive errors as described above, in accordance with embodiments. The system 300 includes three input devices 302, 306, and 310 configured to transmit and/or receive data 304, 308, and 312 related to packages, and a receiving site manager 320 configured to receive the data from each of the three input devices, or at least two of the three input devices. The input devices 302, 306, and 310 may also be configured to mark packages based on instructions, or to display instructions to a user of the input devices, based on data flowing from the receiving site manager 320.

The receiving site manager 320 can contain the following modules: a data in/out (I/O) module 322, a user interface module 324, a prediction module 326, a receiving module 328, a stowing module 330, a verification module 332, a predictive troubleshooting module 334, and a receiving database 336. Any or all of the above modules may be operated from suitable computing resources located on-site at a receiving site such as the receiving site 106 shown in FIG. 1; or located remotely and in communication with the receiving site via a network such as the network 104 (FIG. 1). Furthermore, any or all of the above modules may be split into multiple instances or subdivided between multiple computing devices or servers; or any suitable combination of modules may be operated from a single computing device or server. For example, the receiving database 336 may be multiple databases, may be stored in a cloud computing system, or may include any other suitable means for storing and accessing data related to package receipt, package contents, and package storage at the receiving site.

The data I/O module 322 is configured for managing the data 304, 308, 312 flowing from and to the input devices 302, 306, 310. In one example of a conventional package receiving process in a receiving site (such as the receiving site 106 shown in FIG. 1), a first package (such as the carton 202 shown in FIG. 2) is received and the carton identifier 204 is read by the first input device 302 which can transmit the first data 304 to the receiving site manager 320 where the data I/O module 322 receives the data. The data I/O module 322 relays information associated with the first data 304 to either or both of the prediction module 326 and the receiving database 336. Further along the example package receiving process, the first package is unpacked and its contents are removed therefrom, which optimally include only a collection of items (such as items 214 shown in FIG. 2), but which may also include inner packs containing multiple items (such as inner packs 208 also shown in FIG. 2). The contents undergo a receiving process, which may be manual or automated, wherein an identifier on the contents (such as item identifier 216 shown in FIG. 2, or inner pack identifier 210 also shown in FIG. 2) is read by the second input device 306. The second input device 306 transmits second data 308 to the receiving site manager 320 where the data I/O module 322 receives the data. The data I/O module 322 relays information to either or both of the receiving module 328 and the receiving database 336 associated with receipt of contents of packages. In some cases, the data I/O module 322 may also access information in the receiving database 336 associated with received cartons in order to associate received contents information with received carton information. The contents further undergo a stowing process, which may also be manual or automated, wherein an identifier on the contents (such as item identifier 216 shown in FIG. 2, or inner pack identifier 210 also shown in FIG. 2) is read by the third input device 310. The third input device 310 transmits third data 312 to the receiving site manager 320 where the data I/O module 322 receives the data. The data I/O module 322 relays information associated with the third data 312 to either or both of the stowing module 330 and the receiving database 336 associated with stowage of the contents. In some cases, the data I/O module 322 may access other information in the receiving database 336 associated with received cartons in order to associate stowed contents information with received carton information.

The user interface module 324 is configured for preparing user-readable instructions and information for display, and can also receive user input. For example, the user interface module 324 can, responsive to a query for information concerning an item, carton, vendor, manifest, or any other suitable element, access information in the receiving database 336 and configure for display a graphical representation of information responsive to the query. For example, the user interface module 324 can be configured to, responsive to a query regarding a specific carton identifier, access information in the receiving database 336 related to the carton associated with said identifier, including information related to associated received contents and stowed contents, and configure that information for display. Information included may include flags or warnings generated by, for example, the predictive troubleshooting module 334 or any other suitable module. In some cases, the user interface module 324 may be configured to trigger said configuration for display in response to a flag or warning being detected, and may also instruct one or more display devices to automatically display an alert in user-readable form, in response to a flag or warning being detected.

The prediction module 326 is configured for determining a predicted quantity of items in a carton. The prediction module 326 can communicate with any of (or any suitable subset of): the electronic marketplace 102, vendor 110, and vendor manager 112 (shown in FIG. 1) by way of the network 104, and may also communicate with any other suitable module in the receiving site manager 320. For example, the prediction module 326 can store and retrieve information at the receiving database 336 and/or at the vendor manager 112 relating a carton identifier with a number of items. Then the prediction module 326 can, responsive to the receipt of information associated with a carton, determine a predicted quantity of items associated with that carton. For example, the vendor manager 112 can obtain an invoice or manifest from the vendor 110 associated with a received carton, where said invoice or manifest includes an expected number of items contained within the carton. The prediction module 326 can obtain said expected number of items from the vendor manager 112 via the network 104 and generate a predicted quantity of items based on the expected number of items. An expected number of items may also be stored at the receiving database 336 and be associated with a carton identifier.

Alternatively, the prediction module 326 can use historical data stored at the receiving database 336 for determining a predicted quantity of items. For example, the prediction module 326 can, responsive to the receipt of information associated with a carton, obtain further information related to one or more cartons of the same or similar items previously received from the same or other vendors, including a number of items, from which the prediction module 326 can determine a predicted quantity of items.

The prediction module 326 can also determine a predicted quantity of items based in part on the receipt of data related to a physical parameter of a carton. The first input device 302 can also include one or more measurement devices, which may be automated, manually operated, or a combination of both. The first input device 302 may generate first data 304 related to dimensions, weight, surface markings, or any other suitable parameters of the carton, and may coordinate any suitable portion of said data with information stored in the receiving database 336 to generate or to refine a predicted quantity of items in the carton. For example, where a carton contains only a portion of a shipment, information regarding the shipment obtained by the prediction module 326 from the vendor manager 112 (shown in FIG. 1) may indicate an improperly large quantity of goods being associated with the carton identifier; but information obtained from the first data 304 may indicate that the particular carton contains only a fraction of the total shipment. For example, the first data 304 may indicate that the carton weighs approximately 'X' pounds, while stored information in the receiving database 336 indicates that a carton containing an entire shipment would necessarily weigh approximately twice 'X' pounds. In this first example, the prediction module 326 can adjust the expected number of items to account for the difference between the weight and the expected weight, correcting for weight contributed by dunnage. By way of a second example, a surface marking on a carton may indicate that said carton is a part of a set, e.g., "Package 1 of 2," and said information may be obtained by way of the second input device 306 and be transmitted in the second data 308 to the receiving site manager 320. Said information may cause the prediction module 326 to adjust a prediction of the number of items in the carton according to the information, e.g. to reduce a predicted quantity of items by half. By way of a third example, the first data 304 may indicate that the carton must have a volume of at least 'Y' cubic feet, while stored information in the receiving database 336 indicates that a carton containing an entire shipment would necessarily have a volume of at least a multiple of 'Y' cubic feet. Two or more alternative methods of determining a predicted quantity of items may be used in any suitable combination to generate multiple values; and the prediction module 326 may handle disagreement between two or more alternative methods by: choosing a default method for determining the predicted quantity of items and issuing a flag or alert configured to notify a user of the disagreement between multiple results; defaulting to a highest possible value, a lowest possible value, or a median value of multiple generated predicted quantities of items; issuing a flag to divert a carton to an alternative unpacking protocol; or other suitable handling means.

The receiving module 328 is configured for determining a received quantity of items during and/or after an unpacking operation of the carton. The receiving module 328 can communicate with any of (or any suitable subset of): the electronic marketplace 102, vendor 110, and vendor manager 112 (shown in FIG. 1) by way of the network 104, and may also communicate with any other suitable module in the receiving site manager 320. For example, the receiving module 328 can store and retrieve information at any or all of: the receiving database 336, the prediction module 326, the stowing module 330, and the predictive troubleshooting module 334. The receiving module 328 may communicate with the prediction module 326 for determining whether a received quantity of items matches a predicted quantity of items (at the prediction module 326); and with the predictive troubleshooting module 334 for communicating when a mismatch has occurred.

The receiving module 328 can determine a received quantity of items via the second input device 306, which obtains a number of the contents of an unpacked carton, and transmits second data 308 including at least said number of the contents to the receiving site manager 320. The second input device 306 may additionally obtain information by scanning package identifiers of the contents. The scanned package identifiers may in some cases be inner pack identifiers (such as the inner pack identifier 210 shown in FIG. 2); or in other cases may be item identifiers (such as item identifier 216, also shown in FIG. 2). The second input device 306 may obtain a number of items by way of an automated counting process; may receive the number directly e.g. from a user input; or any other suitable comparable process. In some cases, the number of received items may be obtained by accumulating a number of "hits" of a particular identifier associated with the contents. The receiving module 328 can tally the hits as the contents are processed, based on scanned package identifiers, and take a total number after a set period of time has elapsed, where the time corresponds to or exceeds a duration of the unpacking process, or upon an indication that the receiving process is complete. In alternative embodiments, the receiving module 328 may assume a default value for the received quantity of items, which may be the same as the predicted quantity of items.

The stowing module 330 is configured for determining a stowed quantity of items during and/or after a stowing operation of the received items. The stowing module 330 can communicate with any of (or any suitable subset of): the electronic marketplace 102, vendor 110, and vendor manager 112 (shown in FIG. 1) by way of the network 104, and may also communicate with any other suitable module in the receiving site manager 320. For example, the stowing module 330 can store and retrieve information at any or all of: the receiving database 336, the prediction module 326, the receiving module 328, and the predictive troubleshooting module 334. The stowing module 330 may communicate with the prediction module 326 for determining whether a stowed quantity of items matches a predicted quantity of items (at the prediction module 326); and with the predictive troubleshooting module 334 for communicating when a mismatch has occurred.

The stowing module 330 can determine a stowed quantity of items via the third input device 310, which obtains a number of items stowed at the receiving site after the receiving process, and transmits third data 312 including at least said number of items to the receiving site manager 320. The third input device 310 may additionally obtain information by scanning package identifiers of the items. The scanned package identifiers may in some cases be inner pack identifiers (such as the inner pack identifier 210 shown in FIG. 2); or in other cases may be item identifiers (such as item identifier 216, also shown in FIG. 2). The third input device 310 may obtain a number of items by way of an automated counting process; may receive the number directly, e.g., from a user input; or any other suitable and comparable process. In some cases, the number of received items may be obtained by accumulating a number of "hits" of a particular identifier associated with the items as they are stowed. The stowing module 330 can tally the hits as the items are stowed, based on scanned package identifiers, and take a total number after a set period of time has elapsed, where the time corresponds to or exceeds a duration of the stowing process, or upon an indication that the stowing process is complete.

The verification module 332 is configured for preparing and/or issuing instructions for the correction of errors in the package receiving and stowing processes described above. The verification module 332 can communicate with any of (or any suitable subset of): the electronic marketplace 102, vendor 110, and vendor manager 112 (shown in FIG. 1) by way of the network 104, and may also communicate with any other suitable module in the receiving site manager 320. For example, the verification module 332 can obtain information concerning a predicted quantity of items (of a carton) from the prediction module 326; information concerning a received quantity of items (of the same carton) from the receiving module 328; and information concerning a stowed quantity of items (also of the same carton) from the stowing module 330. The verification module 332 can initiate a problem-solving process, which can entail comparing two numbers of packages or items (such as any two of the predicted quantity of items, received quantity of items, and stowed quantity of items associated with a carton), and may provide instructions to investigate and/or correct a mismatch via the user interface module 324, which can further generate a visual representation of a message indicating the flag or alert to be displayed for a user. The verification module 332 can also receive instructions via the user interface module 324 to access the receiving database 336 and flag information thereon that is associated with one or more received items, cartons, or parameters of said items or cartons (such as the identity of an associated vendor, shipping service, date, quantity, or any other suitable parameter). Flags may be viewable when information concerning the associated entries is accessed, or the generation of the flags may cause an alert to be sent to the user interface module 324, with instructions to provide user-readable directions for correcting one or more errors in receiving or stowage. The verification module 332 can also receive instructions from any other suitable module, such as the predictive troubleshooting module 334, to initiate a problem-solving process as described above.

The predictive troubleshooting module 334 is configured for determining whether an inner pack receive error is likely to have occurred, and for preparing and/or issuing instructions for the correction of an inner pack error. The predictive troubleshooting module 334 can communicate with any of (or any subset of): the electronic marketplace 102, vendor 110, and vendor manager 112 (shown in FIG. 1) by way of the network 104, and may also communicate with any other module in the receiving site manager 320. For example, the predictive troubleshooting module 334 can obtain information concerning a predicted quantity of items (of a carton) from the prediction module 326; information concerning a received quantity of items (of the same carton) from the receiving module 328; and information concerning a stowed quantity of items (also of the same carton) from the stowing module 330. The predictive troubleshooting module 334 can also be configured to provide instructions for the correction of inner pack receive errors, which may include user-readable instructions to break or re-create a package of items; and said instructions may be presented to a user via a display or any comparable method of either or both of the verification module 332 and the user interface module 324, or any other suitable means of presentation.

The predictive troubleshooting module 334 can determine whether an inner pack receive error is likely to have occurred by performing a comparison of the predicted quantity of items, which can be obtained from the prediction module 326, against either or both of the received quantity of items and stowed quantity of items (obtainable from the receiving module 328 and stowing module 330, respectively). For example, the predictive troubleshooting module 334 can obtain the predicted quantity of items and the stowed quantity of items associated with a carton, and determines whether the values of the two numbers are the same. If they are the same, the predictive troubleshooting module 334 can indicate that there is no likelihood of an inner pack error, or can perform no additional action. If the number of stowed items exceeds the number of predicted items, the predictive troubleshooting module 334 can provide an alert to the verification module 332 and trigger a problem-solving process thereat. If the predicted quantity of items exceeds the stowed quantity, the predictive troubleshooting module 334 can perform a modulus division of the two numbers, and determine an action based on the results of the division. If there is no remainder, then the likelihood that an inner pack error has occurred is very high; therefore the predictive troubleshooting module 334 can generate a flag or alert indicating that an inner pack receive error has occurred. This flag or alert can be communicated to the verification module 332 to initiate a problem solving process that includes the flag or alert indicating an inner pack receive error. The same flag or alert can be generated by the predictive troubleshooting module 334 whenever there is a remainder within a range. A suitable range may be, for example, a remainder of 1, 2, or more. In particular, a suitable range may be determined based on a value of the predicted quantity of items, i.e. when the predicted quantity of items is large, the suitable range may be increased.

In some cases, if the number of stowed items exceeds the number of predicted items, the predictive troubleshooting module 334 can perform a modulus division of the two numbers by dividing the stowed quantity by the predicted quantity, and determine an action based on the results of the division. If there is no remainder in this case, then the likelihood that a broken set receive error has occurred is very high; therefore the predictive troubleshooting module 334 can generate a flag or alert indicating that a broken set receive error has occurred, and this flag or alert can be communicated to the verification module 332 to initiate a problem solving process that includes the flag or alert indicating a broken set receive error. In some cases, the broken set receive error may be treated as a subset of inner pack receive errors; such that the flag or alert may indicate instead that an inner pack receive error has occurred. The flag or alert can be generated by the predictive troubleshooting module 334 when there is a small remainder, or a nonzero remainder within a predefined range, as described above.

The predictive troubleshooting module 334 can also compare the predicted quantity of items against the received quantity of items. If the quantities are the same, the predictive troubleshooting module 334 can indicate that there is no likelihood of an inner pack error, can perform no additional action, or can proceed to perform a comparison between the predicted quantity and stowed quantity as described above. If the number of received items exceeds the number of predicted items, the predictive troubleshooting module 334 can provide an alert to the verification module 332 and trigger a problem-solving process thereat; and/or can divert the received items to a problem solving process. Diverting the received items to a problem solving process may include, for example, providing instructions to an automated inventory management system to divert the items to a physical location for inspection. If the predicted quantity of items exceeds the received quantity, the predictive troubleshooting module 334 can perform a modulus division of the two numbers and determine an action based on the results of the division, or the predictive troubleshooting module 334 can store the results of the division (or cause to be stored at, for example, the receiving database 336) and proceed to perform a comparison between the predicted quantity and the stowed quantity as described above.

If there is no remainder, or a low remainder, then the likelihood that an inner pack error has occurred is high; therefore the predictive troubleshooting module can generate a flag or alert indicating that an inner pack receive error has occurred. This flag or alert can be communicated to the verification module 332 to initiate a problem solving process that includes the flag or alert indicating an inner pack receive error. In some cases, this flag or alert can initiate a problem-solving process prior to the stowing act in the inventory management workflow. For example, if an inner pack receive error alert is generated during the receiving process, the alert can be communicated to the user interface module 324, verification module 332, and/or stowing module 330; and instructions to break an inner pack can be provided to an automated system and/or to a human-readable display device at the physical location of the stowing process, such that the inner pack error may be corrected on-the-fly at the stowing process. Said instructions may include directions to break one or more inner packs. Furthermore, this flag or alert can be communicated to one or more other modules or systems for association with information concerning the involved vendor. For example, if a carton shipped by "XYZ Company" causes the generation of an inner pack receive error, then information concerning this error can be communicated to the vendor manager 112, electronic marketplace 102, or receiving database 336. Subsequent cartons shipped by "XYZ Company" can be subjected to alternative unpackaging protocols to accommodate inner packs. For example, when first data 304 concerning the carton identifier is received by the receiving site manager 320, one or more modules such as the prediction module 326 may retrieve information related to the carton. Such information can be retrieved from any suitable source, which may include, for example, the receiving database 336 or the vendor manager 112. If a flag indicating an inner pack error has been previously issued concerning a carton shipped by "XYZ Company," then the system may prepare instructions directing that the contents of the carton are scrutinized for inner packs.

Figure 4:
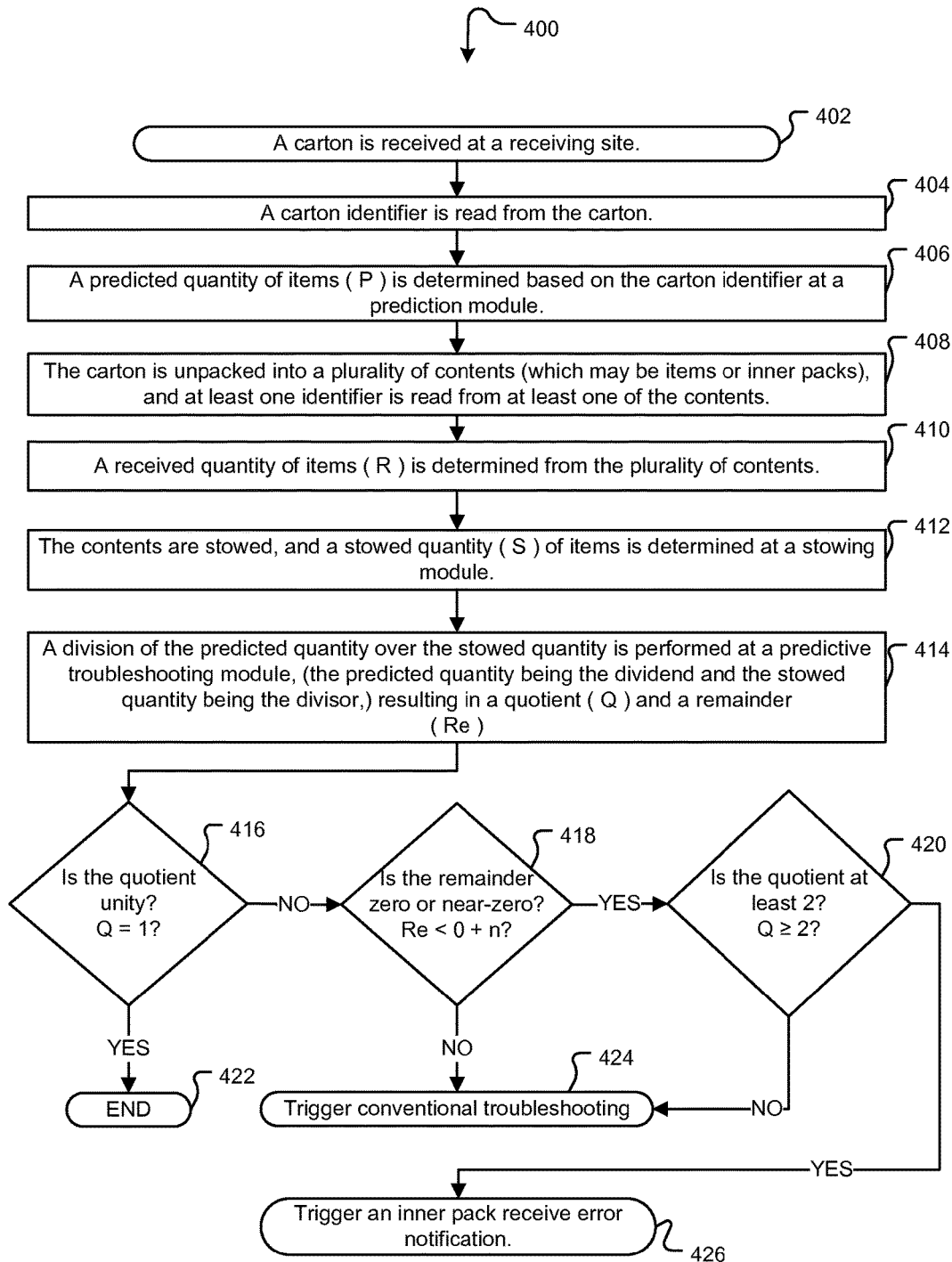
FIG. 4 is a flow chart of an example process for detecting an inner pack receive error in accordance with the systems shown in FIGS. 1-3.

FIG. 4 is a flow chart of a process 400 for enabling the detection of inner pack receive errors, in accordance with embodiments. The elements of the process 400 may be enacted or triggered by executable instructions in a computer system or systems at a manager system such as the receiving site manager 320 (FIG. 3) and at any module therein, including, for example, the predictive troubleshooting module 334 (FIG. 3). In the process 400, a carton is received 402 at a physical receiving site such as the receiving site 106 (FIG. 1) where a carton identifier is read 404 such as carton identifier 204 (FIG. 2). The system determines a predicted quantity of items (P) 406 based at least in part on the carton identifier, which may include using the identifier to retrieve data from a database, may include using information embedded in the carton identifier, and/or any other suitable method of determining a predicted quantity of items as discussed above. The carton is physically unpackaged into a plurality of contents, which may include either or both of items and inner packs; and at least one identifier is read from at least one of the contents 408. Then a received quantity (R) is determined 410 from the contents by, for example, a counting operation, by assuming a default quantity based on the predicted quantity, or any other suitable method of determining a received quantity as described above. The contents are physically stowed 412, and a stowed quantity of items (S) is determined based on any suitable method of determining a stowed quantity of items, also as described above.

The process 400 further includes performing a division 414 of the predicted quantity by the stowed quantity, which can result in a quotient (Q) and remainder (Re), or alternatively just the remainder (Re). The predicted and stowed quantity are compared 416 by, for example, determining whether the quotient is unity (i.e. P==S). If the quantities are equal, there is no inner pack receive error and the process 400 can be terminated 422. If the quantities are not equal, it is determined whether the remainder is within a suitable range 418 to indicate an inner pack receive error. For example, if the remainder is zero, or if the remainder is less than a suitable range (0+n), then an inner pack receive error is likely, and it is further determined whether the quotient is at least two (Q≥2) 420. If the remainder is not zero or within the suitable range, or if the quotient is not at least two, then the system can trigger a conventional troubleshooting process 424, for example by initiating a problem-solving process as described above. If the remainder is zero or within the suitable range, and the quotient is at least two, then the system can trigger an inner pack receive error notification 426.

Figure 5:
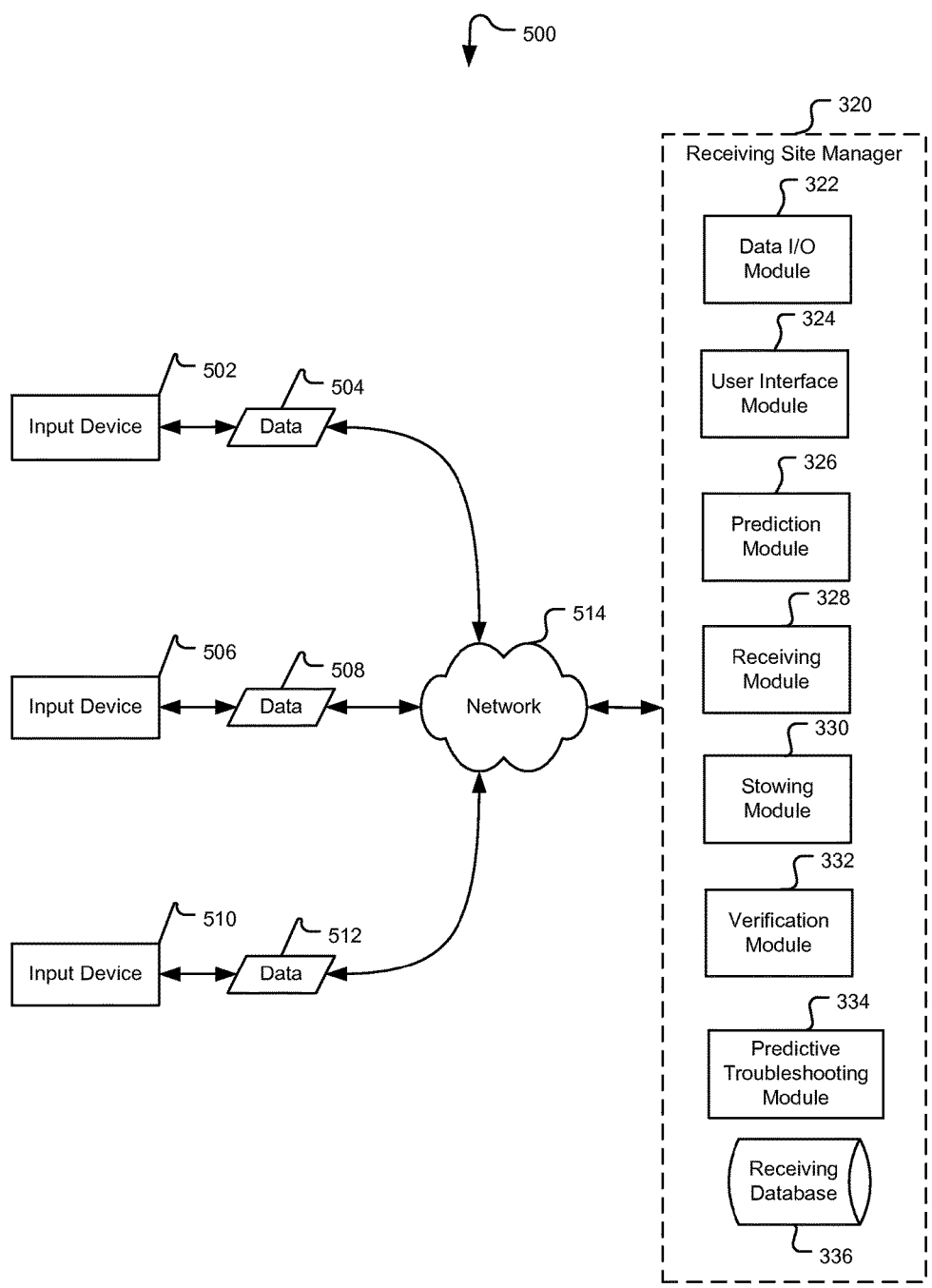
FIG. 5 is a block diagram of an alternative example system for detecting inner pack receive errors in accordance with the systems shown in FIGS. 1 and 2.

FIG. 5 is a block diagram illustrating aspects of an alternative system 500 for enabling the detection of inner pack receive errors as described above, in accordance with embodiments. The system 500 includes three input devices 502, 506, and 510 configured to transmit and/or receive data 504, 508, and 512 related to packages and items via a network 514. The network 514 can be configured to relay information between the input devices 502, 506, and 510 and the receiving site manager 320. The network 514 may be isolated from the network 104 (FIG. 1) via a firewall or other suitable means of protecting a network; or access may be provided via any suitable channels for communication between the networks 514 and 104. For example, communication between the networks may be provided such that the user interface module 324 can provide input and output functionality to a user at a tablet, smartphone, or other wireless network device. Communication between the networks may alternatively be provided such that aspects of such a wireless networking device may be substituted for any of the input devices 502, 506, 510. For example, a camera on a smartphone or tablet may be used for scanning an identifier on any of a carton, carton contents, or items at any of the carton receiving, contents receiving, or stowing processes. Any of the above functions may be provided as discussed above with respect to the system 300 shown in FIG. 3.

Figure 6:
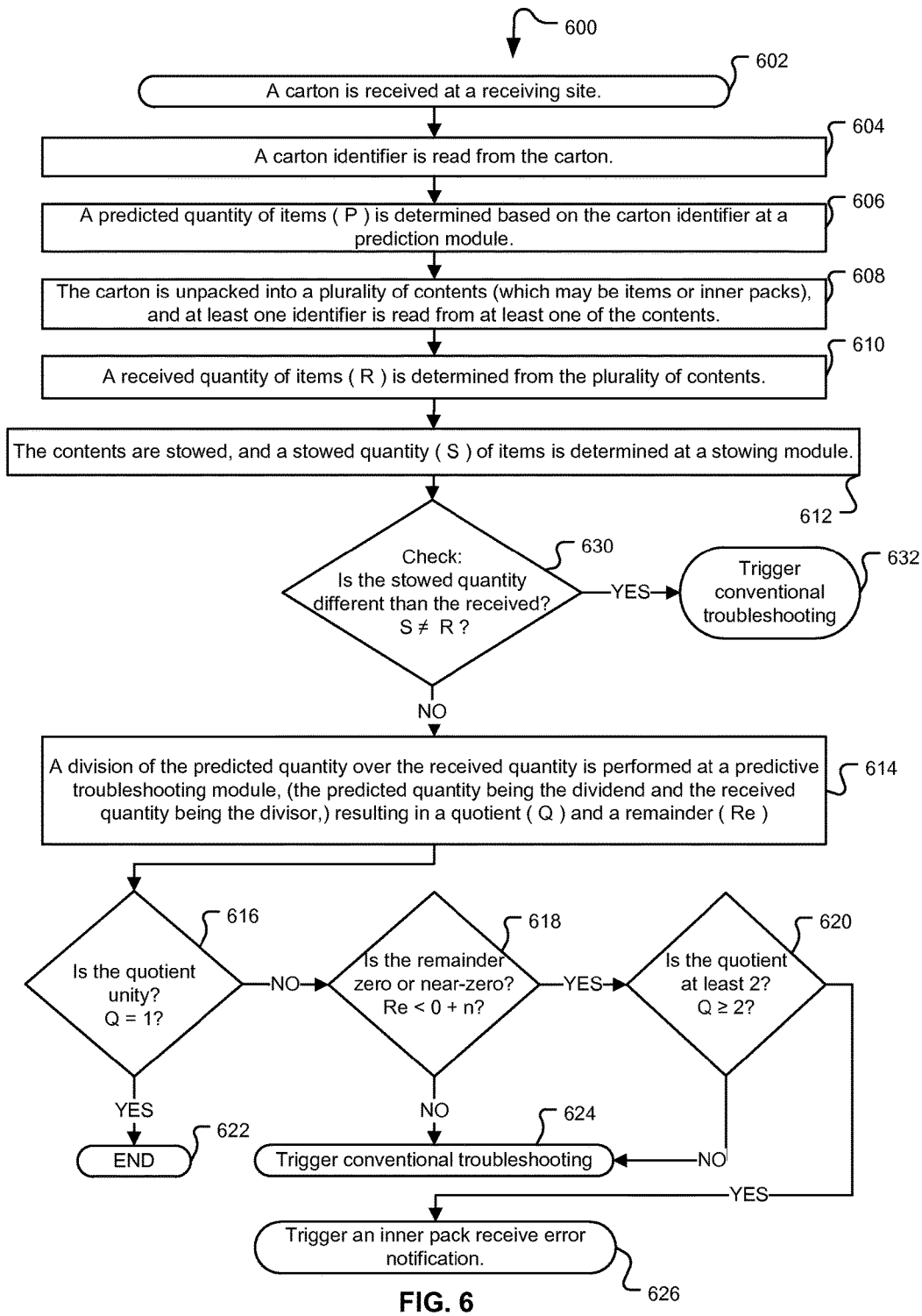
FIG. 6 is a flow chart of an alternative example process for detecting an inner pack receive error in accordance with the systems shown in FIGS. 1-3 and FIG. 5.

FIG. 6 is a flow chart of an alternative process 600 for enabling the detection of inner pack receive errors, in accordance with embodiments. The elements of the process 600 may be enacted or triggered by executable instructions in a computer system or systems at a manager system such as the receiving site manager 320 (FIG. 3) and at any module therein, including, for example, the predictive troubleshooting module 334 (FIG. 3). In the process 600, a carton is received 602 at a physical receiving site such as the receiving site 106 (FIG. 1) where a carton identifier is read 604 such as carton identifier 204 (FIG. 2). The system determines a predicted quantity of items (P) 606 based at least in part on the carton identifier, which may include using the identifier to retrieve data from a database, may include using information embedded in the carton identifier, and/or any other suitable method of determining a predicted quantity of items as discussed above. The carton is physically unpackaged into a plurality of contents, which may include either or both of items and inner packs; and at least one identifier is read from at least one of the contents 608. Then a received quantity (R) is determined 610 from the contents by, for example, a counting operation, by assuming a default quantity based on the predicted quantity, or any other suitable method of determining a received quantity as described above. The contents are physically stowed 612, and a stowed quantity of items (S) is determined based on any suitable method of determining a stowed quantity of items, also as described above.

The process 600 further includes comparing the stowed quantity to the received quantity 630. If the stowed quantity is not equal to the received quantity, the system can trigger a conventional troubleshooting process 632, which can end the predictive troubleshooting process. If the stowed quantity is the same as the received quantity, the system performs a division of the predicted quantity over the received quantity 614 which can result in a quotient (Q) and remainder (Re), or alternatively just the remainder (Re). The predicted and received quantities are compared 616 by, for example, determining whether the quotient is unity (i.e. P=R). If the quantities are equal, there is no inner pack receive error and the process 600 can be terminated 622. If the quantities are not equal, it is determined whether the remainder is within a suitable range 618 to indicate an inner pack receive error. For example, if the remainder is zero, or if the remainder is less than a suitable range (0+n), then an inner pack receive error is likely, and it is further determined whether the quotient is at least two (Q≥2) 620. If the remainder is not zero or within the suitable range, or if the quotient is not at least two, then the system can trigger a conventional troubleshooting process 624, for example by initiating a problem-solving process as described above. If the remainder is zero or within the suitable range, and the quotient is at least two, then the system can trigger an inner pack receive error notification 626.

Figure 7:
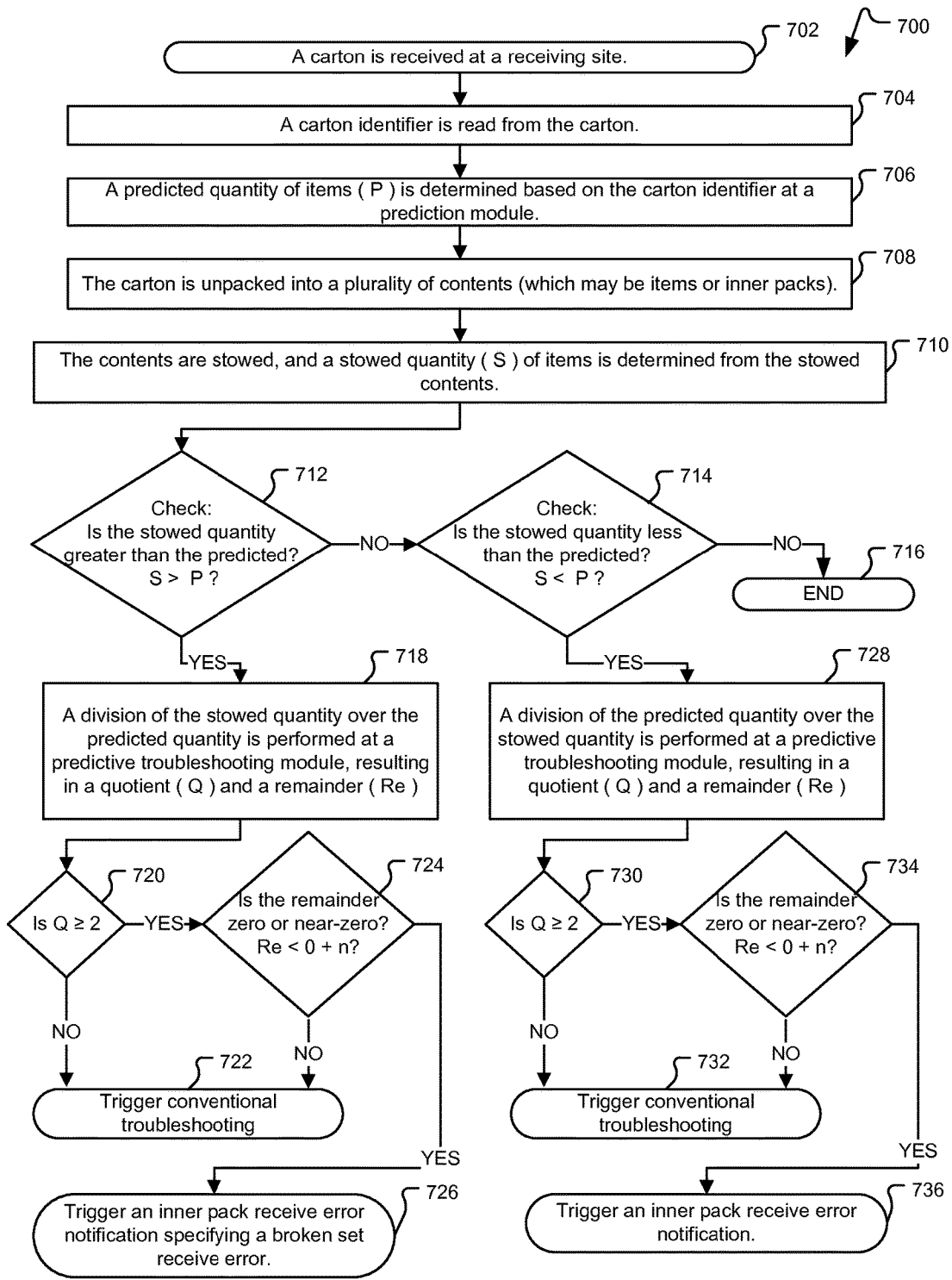
FIG. 7 is a flow chart of a second alternative example process for detecting an inner pack receive error in accordance with the systems shown in FIGS. 1-3 and FIG. 5.

FIG. 7 is a flow chart of an alternative process 700 for enabling the detection of inner pack receive errors, and particularly broken set receive errors, in accordance with embodiments. The elements of the process 700 may be enacted or triggered by executable instructions in a computer system or systems at a manager system such as the receiving site manager 320 (FIG. 3) and at any module therein, including, for example, the predictive troubleshooting module 334 (FIG. 3). In the process 700, a carton is received 702 at a physical receiving site such as the receiving site 106 (FIG. 1) where a carton identifier is read 704 such as carton identifier 204 (FIG. 2). The system determines a predicted quantity of items (P) 706 based at least in part on the carton identifier, which may include using the identifier to retrieve data from a database, may include using information embedded in the carton identifier, and/or any other suitable method of determining a predicted quantity of items as discussed above. The carton is physically unpackaged into a plurality of contents 708, which may include either or both of items and inner packs. The contents are physically stowed 710, and a stowed quantity of items (S) is determined based on any suitable method of determining a stowed quantity of items, also as described above.

The process 700 further includes comparing the stowed quantity to the predicted quantity 712. If the stowed quantity is not greater than the predicted quantity, it is checked whether the stowed quantity is less than the predicted quantity 714. If not, i.e. if the predicted and stowed quantities are equal, the process may end 716.

If the stowed quantity exceeds the predicted quantity (at 712); a division of the stowed quantity by the predicted quantity is performed 718, resulting in a quotient and remainder. If the quotient is less than two 720, a conventional troubleshooting process can be initiated 722. If the quotient is greater than or equal to two (at 720) it is determined whether the remainder is zero or near-zero (i.e., whether the remainder falls within a range from 0 to n, where n is a predetermined value) 724. If the remainder is not zero nor near-zero, then a conventional troubleshooting process can be initiated 722. If the remainder is zero or near-zero (at 724), then an inner pack receive error notification can be issued 726. The error notification can specify that a broken set receive error has occurred (i.e., that inner packs which were not intended to be broken have been broken during receiving and/or stowing).

The process 700 can also accommodate detection of inner pack receive errors without broken set errors. If the stowed quantity is less than the predicted quantity (at 714), then a division of the predicted quantity by the stowed quantity is performed 728, resulting in a quotient and remainder. If the quotient is not at least two 730, a conventional troubleshooting process can be initiated 732. If the quotient is greater than or equal to two (at 730) it is determined whether the remainder is zero or near-zero (i.e., whether the remainder falls within a range from 0 to n, where n is a predetermined value) 734. If the remainder is not zero nor near-zero, then a conventional troubleshooting process can be initiated 732. If the remainder is zero or near-zero (at 734), then an inner pack receive error notification can be issued 736.

The process 700 as it applies to comparing predicted and stowed quantities can also apply to predicted and received quantities, where a received quantity is determined based on a number of packages, contents, or items removed from a carton during receiving. A process comparing predicted and received items may be used, for example, when a stowing process is automated following a receiving or an unpacking process such that received and stowed items would be identical, or when the detection of an inner pack receive error during a receiving step in an inventory management system causes a notification to be provided so as to correct errors as early as the stowing step in the same inventory management system for the same packages, contents or items.

Figure 8:
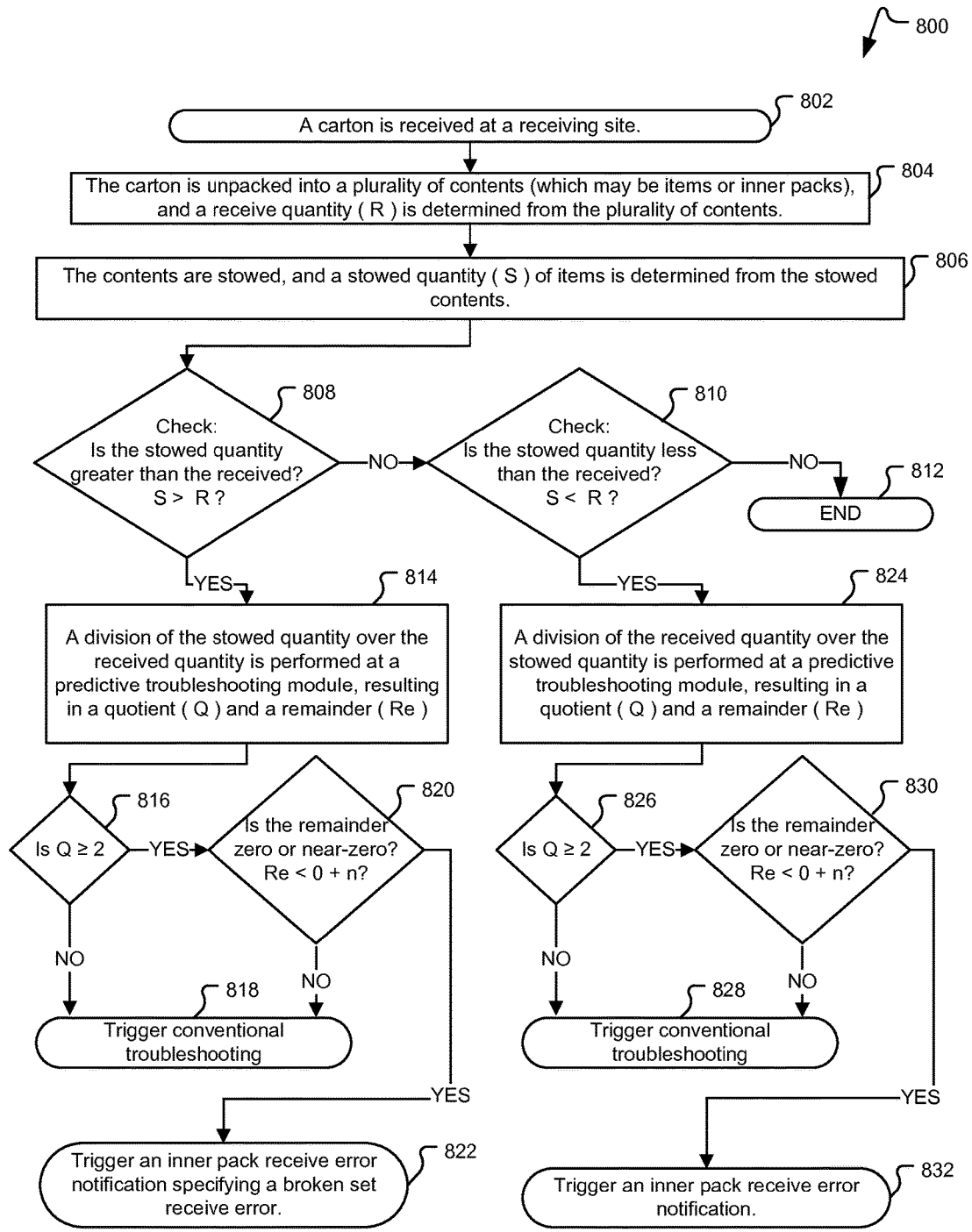
FIG. 8 is a flow chart of a third alternative example process for detecting an inner pack receive error in accordance with the systems shown in FIGS. 1-3 and FIG. 5.

FIG. 8 is a flow chart of an alternative process 800 for enabling the detection of inner pack receive errors, including broken set receive errors, in an inventory system that identifies received and stowed quantities but does not necessarily identify predicted quantities, in accordance with embodiments. The elements of the process 800 may be enacted or triggered by executable instructions in a computer system or systems at a manager system such as the receiving site manager 320 (FIG. 3) and at any module therein, including, for example, the predictive troubleshooting module 334 (FIG. 3). In the process 800, a carton is received 802 at a physical receiving site such as the receiving site 106 (FIG. 1). The carton is physically unpackaged into a plurality of contents, which may include either or both of items and inner packs, and a received quantity (R) is determined from the plurality of contents 804. The contents are physically stowed 806, and a stowed quantity of items (S) is determined based on any suitable method of determining a stowed quantity of items, also as described above.

The process 800 further includes comparing the stowed quantity to the received quantity 808. If the stowed quantity is not greater than the received quantity, it is checked whether the stowed quantity is less than the received quantity 810. If not, i.e. if the received and stowed quantities are equal, the process may end 812.

If the stowed quantity exceeds the received quantity (at 808); a division of the stowed quantity by the received quantity is performed 814, resulting in a quotient and remainder. If the quotient is less than two 816, a conventional troubleshooting process can be initiated 818. If the quotient is greater than or equal to two (at 816) it is determined whether the remainder is zero or near-zero (i.e., whether the remainder falls within a range from 0 to n, where n is a predetermined value) 820. If the remainder is not zero nor near-zero, then a conventional troubleshooting process can be initiated 818. If the remainder is zero or near-zero (at 820), then an inner pack receive error notification can be issued 822. The error notification can specify that a broken set receive error has occurred (i.e., that inner packs which were not intended to be broken have been broken during stowing).

The process 800 can also accommodate detection of inner pack receive errors without broken set errors. If the stowed quantity is less than the received quantity (at 810), then a division of the received quantity by the stowed quantity is performed 824, resulting in a quotient and remainder. This situation can occur, for example, if a receiving system detects multiple identifiers on co-packaged items in a set, or reads a number of items from a contents list on a co-packaged set, or other comparable event. If the quotient is not at least two 826, a conventional troubleshooting process can be initiated 828. If the quotient is greater than or equal to two (at 826) it is determined whether the remainder is zero or near-zero (i.e., whether the remainder falls within a range from 0 to n, where n is a predetermined value) 830. If the remainder is not zero nor near-zero, then a conventional troubleshooting process can be initiated 828. If the remainder is zero or near-zero (at 830), then an inner pack receive error notification can be issued 832.

Some or all of the processes 400, 600, 700, and 800 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 9:
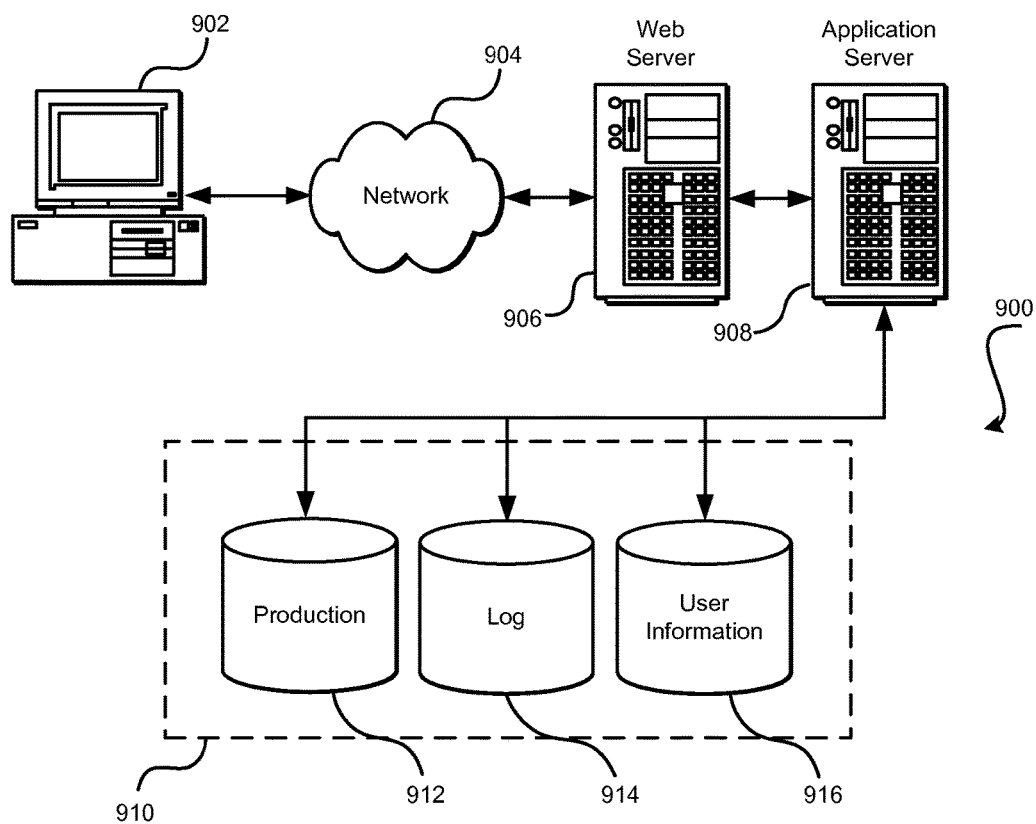
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for detecting inner pack receive errors at a package receiving site that receives a first package containing a plurality of second packages, each second package containing at least one stowable unit, the method comprising:
   receiving, by a computer system at the package receiving site, a first count indicating a first prediction of a number of stowable units in the first package;
   receiving a second count indicating a number of second packages originating from the first package having undergone a stowing operation; and
   performing a predictive troubleshooting act comprising:
      determining that the first count is not equal to the second count;
      performing a modulus division of the first count with respect to the second count, resulting in a remainder;
      detecting an inner pack receive error based at least in part on the remainder; and
      providing an indication for presentation to a user that the inner pack receive error has been detected.

2. The computer-implemented method of claim 1, wherein detecting an inner pack receive error comprises detecting that the first count is greater than the second count and that the remainder is zero.

3. The computer-implemented method of claim 1, wherein providing an indication for presentation further comprises providing instructions to unpack an inner package.

4. The computer-implemented method of claim 1, further comprising updating vendor information by generating a flag indicating at least that an inner pack receive error has been detected and associating the flag with the vendor information.

5. The computer-implemented method of claim 1, wherein receiving the first count further comprises:
   receiving a carton identifier corresponding to the first package; and
   obtaining the first count from a data store based in part on the carton identifier.

6. The computer-implemented method of claim 1, wherein receiving the first count further comprises:
   receiving information concerning a physical parameter of the first package; and
   obtaining the first count based in part on the physical parameter.

7. The computer-implemented method of claim 1, wherein receiving the second count further comprises:
   receiving a plurality of instances of data indicating that the plurality of second packages has been scanned; and
   determining the second count by counting a number of the instances.

8. The computer-implemented method of claim 1, further comprising:
   determining that the first count is greater than the second count; and
   detecting the inner pack receive error based at least in part on the first item count being greater than the second count.

9. The computer-implemented method of claim 8, wherein detecting the inner pack receive error further comprises determining that the remainder is within a range from 0 to n; and wherein n is within a predefined range.

10. A system comprising:
    one or more processors; and
    memory including instructions that, when executed with the one or more processors, cause the system to, at least:
       receive a first package at a package receiving site, the first package having a first identifier and containing a plurality of second packages therein, each second package containing at least one stowable unit;
       generate, at a first processing operation, a first quantity corresponding to a number of stowable units in the first package based at least in part on the first identifier;
       generate, at a second processing operation, a second quantity based on the plurality of second packages;
       perform a division based on the first quantity and the second quantity, resulting in a remainder;
       detect one of an inner pack receive error or a broken set receive error based at least in part on the remainder; and
       provide an indication for presentation to a user that the inner pack receive error or broken set receive error has been detected.

11. The system of claim 10, wherein the instructions further cause the system to, at least, detect the one of an inner pack receive error or a broken set receive error by at least determining that the remainder is 0.

12. The system of claim 10, wherein the instructions further cause the system to, at least, detect the one of an inner pack receive error or a broken set receive error by further determining that the remainder is within a range from 0 to n, where a value of n is based in part on the first quantity.

13. The system of claim 10, wherein the instructions further cause the system to, at least, generate the first quantity by, at least:
receiving vendor information based in part on the first identifier; and
retrieving the first quantity from a data store based in part on the vendor information.

14. The system of claim 10, wherein the instructions further cause the system to generate the first quantity by, at least:
receiving physical parameter information concerning a physical parameter of the first package; and
generating the first quantity based in part of the physical parameter information.

15. The system of claim 10, wherein the instructions further cause the system to, at least, obtain data concerning the first identifier from an input device via a wireless network.

16. The system of claim 10, wherein:
each of the plurality of second packages has a respective second identifier; and
the instructions further cause the system to generate the second quantity based at least in part on the respective second identifier of each of the plurality of second packages.

17. The system of claim 10, wherein the instructions further cause the system to provide an indication for presentation to a user with directions to unpack a second package.

18. A computer-implemented method for detecting broken set receive errors at a package receiving site that receives a first package containing a plurality of second packages, each second package containing at least one stowable unit, the method comprising:
receiving, by a computer system at the package receiving site, a first count indicating a first prediction of a number of stowable units in the first package;
receiving a second count indicating a number of second packages originating from the first package having undergone a stowing operation; and
performing a predictive troubleshooting act comprising:
determining that the first count is not equal to the second count;
performing a modulus division of the first count with respect to the second count, resulting in a remainder;
detecting a broken set receive error based at least in part on the remainder; and
providing an indication for presentation to a user that the broken set receive error has been detected.

19. The computer-implemented method of claim 18, further comprising:
determining that the second count is greater than the first count;
detecting the broken set receive error based at least in part on the second count being greater than the first count.

20. The computer-implemented method of claim 18, wherein providing an indication for presentation further comprises providing instructions to unpack an second package.

21. The computer-implemented method of claim 18, further comprising updating vendor information by generating a flag indicating at least that a broken set receive error has been detected and associating the flag with the vendor information.

22. The computer-implemented method of claim 18, wherein receiving the first count further comprises:
receiving a first package identifier corresponding to the first package; and
obtaining the first count from a data store based in part on the first package identifier.

23. The computer-implemented method of claim 18, wherein receiving the first count further comprises:
receiving information concerning a physical parameter of the first package; and
obtaining the first count based in part on the physical parameter.

24. The computer-implemented method claim 18, wherein receiving the second count further comprises:
receiving a plurality of instances of data indicating that the plurality of second packages has been scanned; and
determining the second count by counting a number of the instances.

25. The computer-implemented method of claim 18, wherein detecting the broken set receive error further comprises determining that the remainder is within a range from 0 to n; and wherein n is within a predefined range.

* * * * *